United States Patent [19]
Stanley

[11] Patent Number: 5,819,819
[45] Date of Patent: Oct. 13, 1998

[54] FLEXIBLE OIL DRAIN APPARATUS

[76] Inventor: Mark Stanley, 376 Fairhill Ave., Langhorne, Pa. 19047

[21] Appl. No.: 857,141

[22] Filed: May 15, 1997

[51] Int. Cl.⁶ ....................................................... B65B 1/04
[52] U.S. Cl. ............................... 141/98; 141/114; 141/86
[58] Field of Search ......................... 141/98, 114, 86–88; 184/106, 1.5; 220/573

[56] References Cited

U.S. PATENT DOCUMENTS

| | | | |
|---|---|---|---|
| 1,582,758 | 4/1926 | Jones | 184/1.5 |
| 4,592,448 | 6/1986 | Morris | 141/98 |
| 4,936,418 | 6/1990 | Clausen | 184/106 |
| 5,365,968 | 11/1994 | Mills | 141/114 |

*Primary Examiner*—David J. Walczak
*Assistant Examiner*—Steven O. Douglas
*Attorney, Agent, or Firm*—Daniel Kramer

[57] ABSTRACT

A device for facilitating the process of draining oil from a sump having a drain plug. The device includes a flexible oil-resistant sheet-like apparatus having a periphery and an oil drain tube and having a wrench shaft traversing the sheet through an oil-sealing gland. The flexibility of the sheet allows the wrench shaft to be aligned with the sump drain plug. Elastic bands attached to the sheet periphery are provided for attachment to structure above the oil sump for raising the sheet periphery above the level of the drain plug whereby the flexibility of the sheet allows it to assume a concave shape so that oil released from the sump is retained and flows out the oil drain tube.

16 Claims, 3 Drawing Sheets

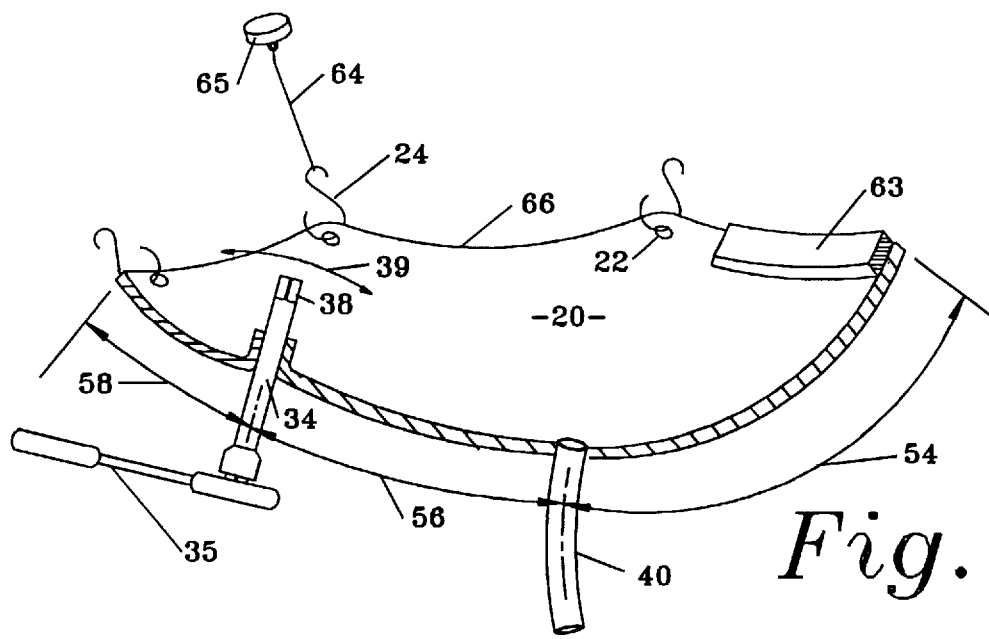
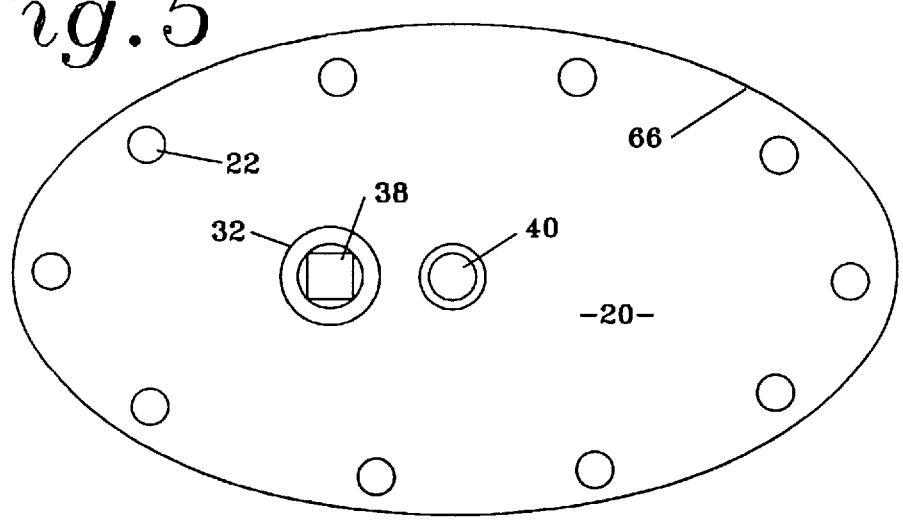
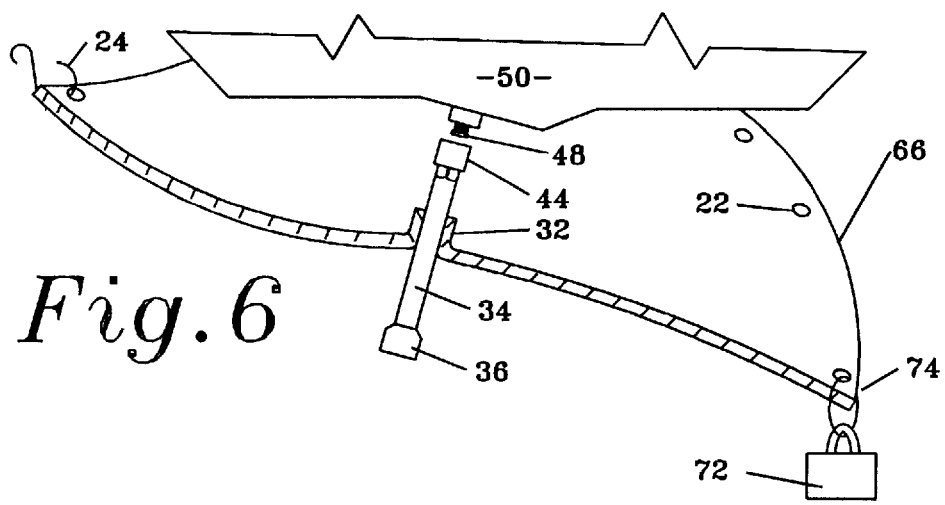

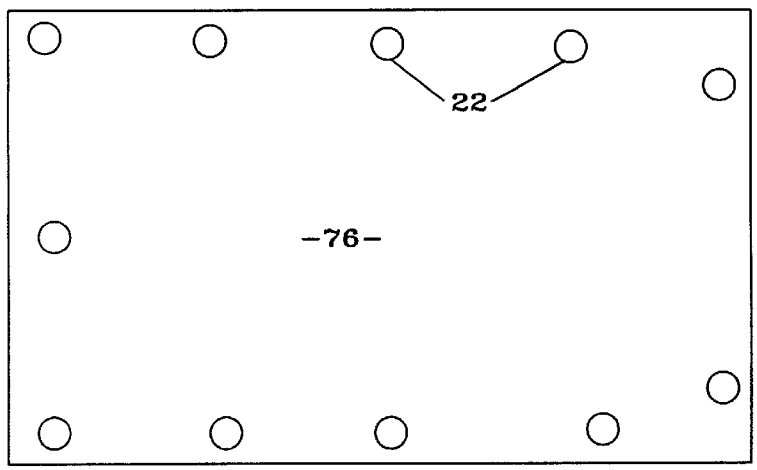
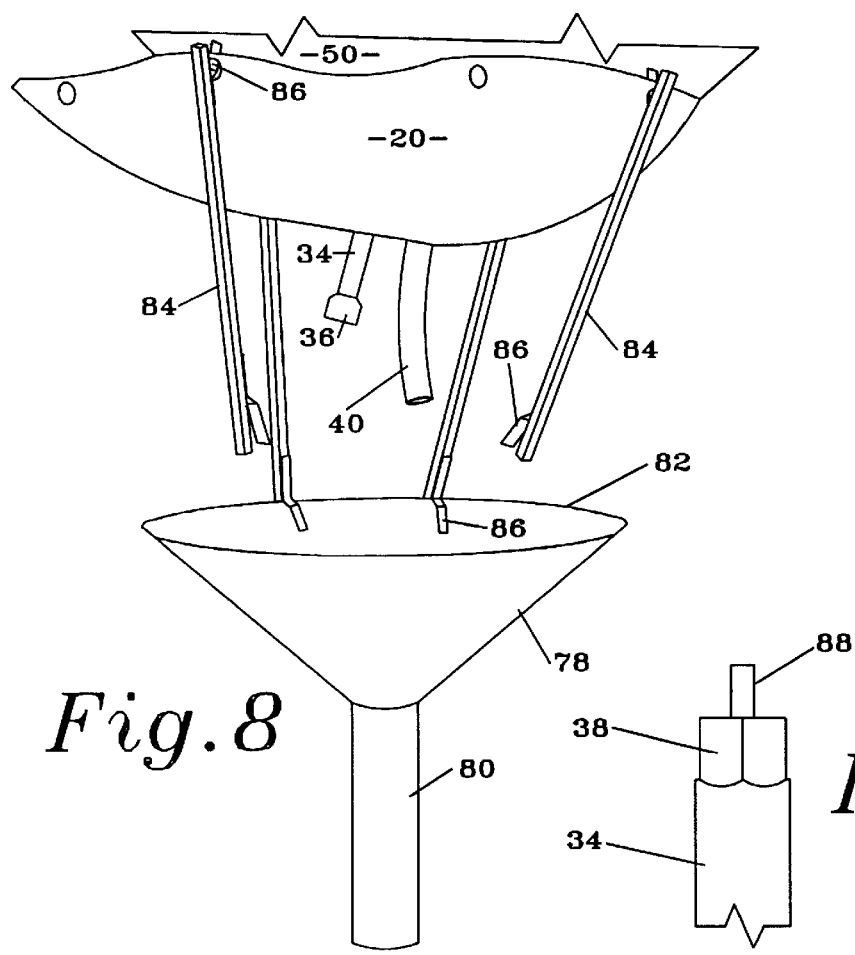

FLEXIBLE OIL DRAIN APPARATUS

BACKGROUND

1. Discussion of Prior Art

To facilitate oil removal from auto engines, service stations and garages generally employ a large oil receiving drum, sometimes wheel-mounted, having an upright pipe terminating in a large funnel at the top. In use the funnel is raised to a position just under the engine drain plug. The elevation of the funnel is made adjustable by providing a long tail or outlet tube on the funnel which can be positioned at various levels within the upright pipe and locked there.

However, the service person must attach her wrench to the oil drain plug and remove the plug, thereby exposing her hands and sleeves and clothing to hot oil gushing from the drain fitting when the drain plug finally comes loose.

2. Objects and Advantages

Both professional and home mechanics are frequently faced with the need to change the oil in trucks and autos. Both classes of mechanics desire to perform this job with a minimum of fuss and mess. Home mechanics, not having a lift for their vehicles, typically crawl under them, position a shallow pan under the drain fitting and then unscrew the drain plug and hope for the best. It is almost impossible to remove the oil drain plug without being sprayed with hot dirty oil. The case for Diesel engines is even worse, since used Diesel oil is jet black and leaves an unremovable stain on clothing. Also, since the oil is (or should be) hot, for best and most complete drainage of the old oil, the home mechanic in his haste to remove his tender hands from the gushing stream of hot oil generally drops the drain plug which falls into the drain pan along with the first gush of hot oil and must be retrieved later along with the thin copper gasket which falls off the plug and is frequently lost.

In particular, female home mechanics tend to avoid extremely messy jobs, especially those which are almost certain to permanently soil clothing, even work clothing.

Therefore it is an object of the present invention to provide means for a mechanic to attach her wrench to and remove the drain plug of a hot oil sump without being exposed to any oil at all, and to magnetically retain control of the plug to prevent it from falling into the hot oil or from getting lost.

It is a further object of the invention to provide oil-resistant flexible sheet-like means for positioning under the oil sump and the oil drain fitting for receiving oil discharged by the oil drain fitting when its plug is removed, the sheet means having a peripheral edge and a sump or liquid side for receiving and for contact with the oil and a mechanic or dry side.

It is a further object to provide such a sheet having either a regular shape such as a rectangle or an ellipse or an irregular shape.

It is a further object to provide such means where the flexible sheet includes an oil tight gland or seal through which a wrench shaft means rotatably traverses. The wrench shaft has an end on the mechanic side and an end on the sump side. The shaft end on the sump side has means for accepting sockets or drivers which fit the oil drain plug addressed, and a magnet for retaining the removed plug, while the shaft end on the mechanic-side has a socket, flats or other means for applying torque and rotary motion to the shaft and the socket or driver Such means would include means such as a fixed lever or an open-end or box wrench or a ratchet wrench.

It is a further object to provide such an oil tight gland or seal which includes a bearing and means for attaching the gland and bearing to a new or replacement sheet when the old sheet must be replaced.

It is a further object to provide such a sheet where the wrench shaft is substantially centrally located in the sheet.

It is further object to provide such a sheet where the wrench shaft is not located centrally, but is located substantially off center or near a sheet edge.

It is a further object to provide such means where the flexible sheet includes at least one oil drain tube, generally centrally located in the sheet.

It is a further object to provide such means where the sheet has no oil drain tube but is pitched or pitchable toward a low point in the periphery.

It is a further object to provide means for raising the sheet periphery to an elevation higher than the drain fitting so that oil, released into the concave sump-side of the sheet, flows to the drain tube. In a first case the raising means provides for attachment of the periphery to points or to structures positioned above the oil sump. Such raising means include: elastic bands or coil springs attached to several points around the sheet periphery and hooks for attaching the bands or spring to said points or structures, or by magnets attached by flexible cords to the sheet periphery; or by magnets attached directly to the sheet edge for attachment to the same elevated points or structures. In a second case the raising means provides for substantially rigid members having one end attached to the sheet edge, and having another end attached to an oil collecting funnel positioned below.

BRIEF DESCRIPTION OF THE DRAWINGS

FIG. 4 illustrates a sheet having the wrench gland positioned off-center, near the sheet periphery and having, as alternate support means, a edge-mounted magnet for securing the sheet edge to an engine part or the sump itself.

FIGS. 5 and 7 show alternate shapes, of an infinity of shapes, which the sheet may have.

FIG. 6 shows a sheet lacking a drain tube but instead having a weight at one point in the sheet periphery to create a low-point in the sheet periphery and thereby to allow oil to exit the sheet at that low point.

FIG. 8 shows a sheet supported from underneath by rigid members engaging both the sheet periphery and the funnel.

FIG. 9 shows a side elevation of the socket end of the shaft with a plug-retaining magnet installed.

DETAILED DESCRIPTION OF THE INVENTION

Figure 1:
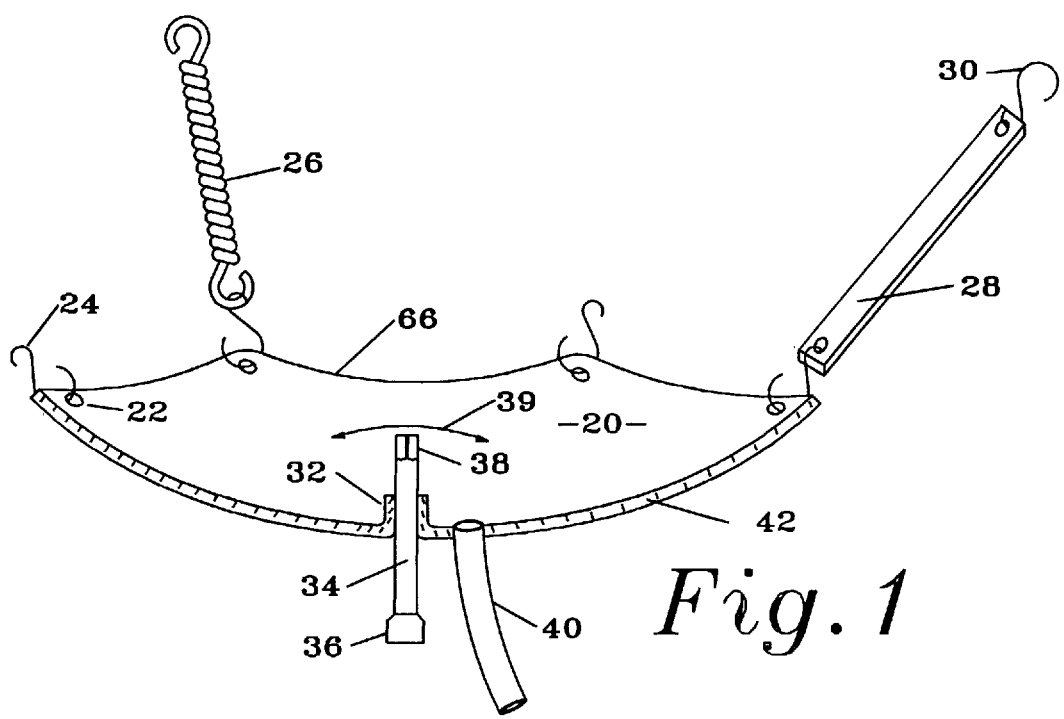
FIG. 1 shows a cross-sectional view of an oil drain sheet having a wrench shaft and an oil drain and having edge supports including a spring and an elastic attached to the sheet edge by hooks.

FIG. 1 shows a cross-sectional view of oil drain sheet 20 which is shown in planar view in FIG. 5. The oil drain sheet is formed of a flexible material such as oil-resistant rubber, neoprene or polyethylene, though other materials will work satisfactorily. For an automotive application the sheet is 18 inches (46 mm) long and 14 inches (35.5 mm) wide and 3/32 inch (0.25 cm) thick. Different lengths, widths and thicknesses will work satisfactorily, depending on the physical properties of the material employed and the desired life under the expected conditions of use. Larger and thicker sheets may be useful where a larger oil quantity is to be drained from a larger machine.

The oil drain sheet 20 in FIG. 1 is stretched or draped into a shape having a convex interior, the liquid side, by elastic tensioning elements. Holes 20 formed in the periphery 66 of sheet 20 provide attachment means for hooks 24. In turn hooks 24 engage and are biased upward by elastic tensioning element 28. Tensioning element 28 is a polymeric elastic such as rubber or neoprene. The tensioning element 28 is formed with holes at each end. The hole at the lower end of elastic 28 engages hook 24 which provides tension to drain sheet 20. The upper hole in elastic 28 engages hook 30. Hook 30 is provided to engage some elevated part of a machine or device whose oil is to be drained.

In an alternate construction, spring 26 replaces elastic 26 for the same purpose. The loop at the end of spring 26 may directly engage hole 22 in the drain sheet, in an alternate construction.

A wrench shaft 34 rotatably traverses an oil tight gland 32 substantially centrally positioned in the body of sheet 20. An alternate construction for this gland is shown and described in connection with FIG. 3. By virtue of the flexibility of the material used to form drain sheet 20, wrench shaft 34 is moveable over arc 39 to allow it to line up with and engage oil drain plugs having either a vertical axis or an axis having an angle with the vertical.

The wrench shaft has a square driven-end 38 (the liquid end) positioned within the concave or liquid side or sump side of the drain sheet. The square end is intended for insertion into a hex or other type socket needed to engage a drain plug. A magnet 88 (FIG. 9) is inserted into the center of the square end 38 to attract and retain the drain plug as it is removed, to keep it from falling into the hot oil of from getting lost. The shaft has a recessed driver end 36, on the convex or mechanic or dry side of the oil sheet, for accepting a ratchet 35 (FIG. 4) or similar driver. In another construction shown in FIG. 2, the driver end of shaft 34 is formed with flats 37 for use with an open end or adjustable or box wrench.

An oil drain tube 40 is secured to the drain sheet with its upper open end substantially flush with the concave surface of the drain sheet. The oil drain tube is typically located substantially centrally in the expanse of the oil drain sheet. The oil drain tube is flexible and typically has an inside diameter of 0.5 inches (1.3 cm), though, depending on the viscosity or quantity of the oil to be drained, larger or smaller inside diameters could be employed. In the construction shown, drain tube 40 is heat sealed to the oil drain sheet, but alternate constructions involving cements or ferrules would be suitable.

Figure 2:
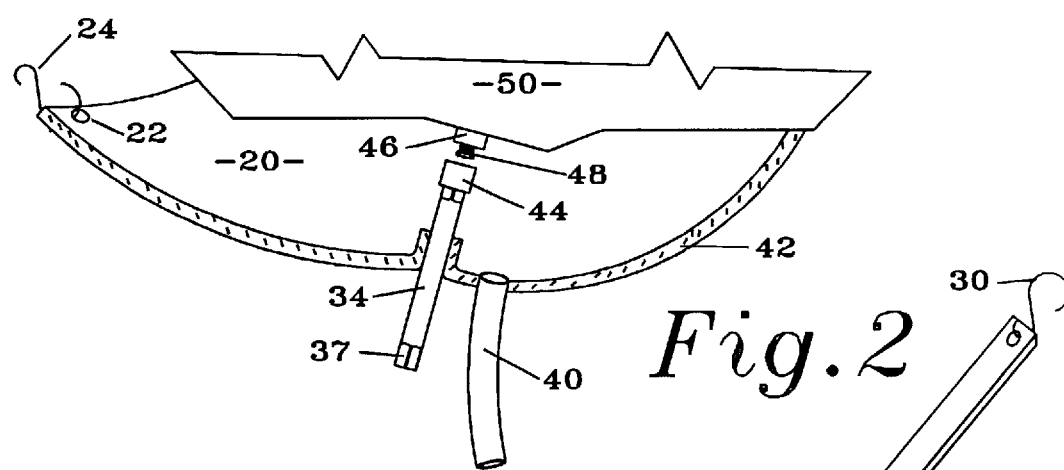
FIG. 2 shows the same sheet positioned under an oil sump with the flexible sheet distorted to allow the wrench to align with the drain plug.

In FIG. 2 there is shown the bottom portion of oil sump 50. Positioned in the bottom of the oil sump is drain fitting 46 closed by threaded oil drain plug 48. Oil drain plug 48 has a hexagonal end for engagement by a socket, but other drain plug constructions such as recessed for Allen wrenches or splined recesses are likely. Socket 44 is positioned on the square driven end of wrench shaft 34. Wrench shaft 34 is tilted over arc 39 to the degree necessary to allow it to align with the axis of drain plug 48.

The wrench shaft 34 and socket 44 are then lifted to engage oil drain plug 48. The plug 48 is removed and retained in the socket by magnet 88 (FIG. 9) while allowing the hot oil to gush out of sump 50. However, throughout the draining process, no oil can spill on the mechanic and consequently her hands and clothing remain clean. The oil accumulates briefly in the concave receptacle formed by drain sheet 20, the liquid side, and subsequently flows though oil drain tube 40 to a disposal container. (not shown)

Figure 3:
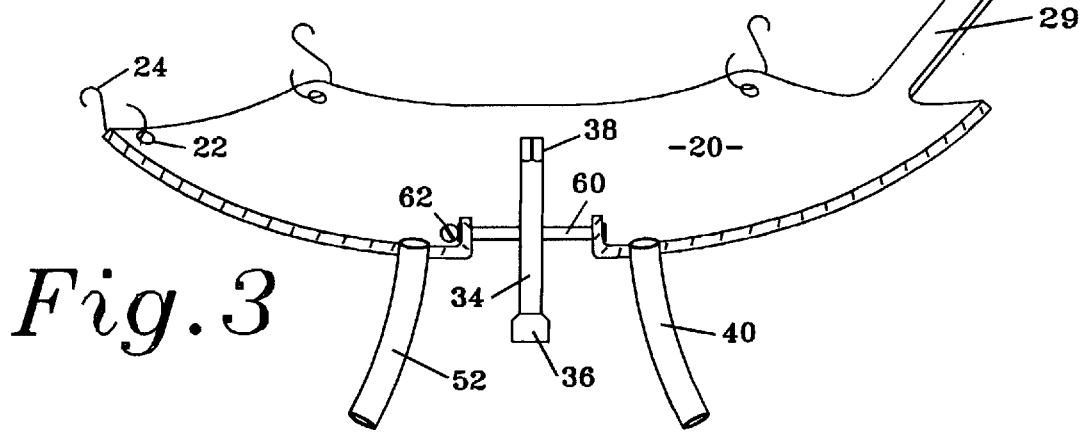
FIG. 3 Shows a sheet having multiple drains and a gland for the wrench including a replaceable bearing.

FIG. 3 shows two drain tubes, 40 and 52. These are positioned substantially centrally in the drain sheet and are on alternate sides of the wrench shaft. In FIG. 3, wrench shaft 34 is provided with an industrial type oil-tight gland employing a sealed bearing held in place in oil sheet 20 with circumferential clamp 62. A hose clamp is shown but other clamps suitable for the purpose may be employed. With this construction, the drain sheet may be readily replaced when worn or leaking without discarding the more expensive shaft and bearing.

In FIG. 3, elastic 29 is formed from the body of the oil sheet itself instead of being connected to the drain sheet via hook 24.

In another construction, elastic 29 is formed from a separate piece and glued or otherwise sealed to the periphery of the drain sheet.

FIG. 4 displays a variation of the oil drain sheet of FIG. 1. In FIG. 4 peripheral hole 22 is engaged by hook 24. However, instead of an elastic such as spring 26 or rubber 28, a magnet 65 is provided connected to hook 24 by cord 64. The magnet is positioned on an iron or steel member of the auto or machine in such a position to bias the periphery 66 of sheet 20 to a level comparable to that illustrated in FIG. 2. That is, to a position higher than the oil drain fitting 46 of FIG. 2. In an alternate construction there is provided flexible magnet 63 which is bonded to the periphery 66 of sheet 20. Magnet 63 is positioned on an upper portion of oil sump 50 in such a way that the general configuration of sheet 20, with periphery 66 higher than oil drain fitting 46, as shown in FIG. 2, is retained.

Referring again to FIG. 4, oil drain tube 40 is positioned within a central area comprising twenty percent of the sheet area and positioned at the approximate low point of the concave shape, or wet side, assumed by sheet 20. That is, within the area where arc 54 subtends approximately one half the sum of the angular distances of angles 54, 56 and 58. By contrast with the position of wrench shaft 34 within the sheet central area in FIGS. 1, 2 and 3, in FIG. 4 wrench shaft 34 is positioned outside the central area and substantially closer to the sheet periphery 66. This position of the wrench shaft provides significantly more visibility to the mechanic as she attempt to engage the socket at the end of shaft 34 (FIG. 2) with the oil drain plug. In a preferred arrangement the ratio of angle 58 to angle 56 is 1:3, though positioned outside the central area and in particular having angular ratios from 1:5 to 1:2 are disclosed as useful for particular purposes.

In FIG. 4 wrench 35 is illustrated engaged with wrench shaft 34 for the purpose of exerting torque on the wrench shaft for unscrewing or screwing a drain plug.

FIG. 5 shows a plan view of oil drain sheet 20 having an elliptical periphery 66, before the sheet is drawn into a concave configuration by magnets or elastics. A top view of gland or seal 32, shaft 34 with its square end 38 and oil drain tube 40 is clearly displayed.

In FIG. 6 the drain sheet 66 is supported in such a way by its peripheral supports that one portion 74 of its periphery 66 is unsupported. This unsupported portion is biased to a low point 74 by weight 72 attached to a peripheral hole 22 by a hook 24 or similar means. In this configuration of the invention no drain tube is required and oil liberated by unscrewing plug 48 from sump drain fitting 46 simply flows over the liquid side to the low point 74 of sheet 20 where an accumulating reservoir (not shown) is provided to catch the oil flowing off the edge of the sheet.

FIG. 7 shows an alternate outline for a drain sheet here identified as —76—. This configuration can be applied to all variations of the invention herein described.

In FIG. 8 the drain sheet is supported from drain funnel 78, or another structure positioned under drain sheet 20, by way of rigid struts 84. Each strut 84 has at each end a clip or attachment means 86 allowing it to engage or otherwise fasten to sheet 20 at its upper end and the lip 82 of funnel 78 by the other, lower, end. In a professional environment the struts and the oil drain sheet 20, supported thereby, would remain in an operating configuration for use as required by operating personnel.

Such a configuration would substantially speed and simplify the process of draining oil from the engine oil sump of a vehicle without the concomitant dripping and mess normally accompanying such an operation.

While the above description of the construction and use of my invention contains many specifics, these should not be construed as limitations on the scope of the invention but merely as examples of the several preferred embodiments thereof. Accordingly the scope of my invention should be determined, not by the embodiments illustrated, but by the following claims and the legal equivalents of their structures.

I claim:

1. An apparatus for neatly draining a liquid from a sump having a threaded drain plug, said apparatus comprising:

a flexible polymeric sheet having a length, a width, a periphery comprising segments thereof, a liquid side for containing liquid drained from the sump, a dry side and a central area, a rotatable wrench shaft having a centerline and two ends, said shaft being positioned to traverse the sheet from the liquid side to the dry side, said shaft thereby having a liquid end positioned on the liquid side and a dry end positioned on the dry side, and further providing that the centerline of the shaft is moveable through an arc by virtue of the flexibility of the sheet, seal means for sealing the shaft to the sheet, whereby the shaft may rotate, while preventing liquid on the liquid side of the sheet from flowing to the dry side of the sheet through or around the seal.

2. A liquid draining apparatus as set forth in claim 1, further providing:

means for supporting segments of the sheet periphery at a level higher than the central area, said means comprising means for engaging said segments of the sheet periphery and securing said segments above the sheet central area.

3. A liquid draining apparatus as set forth in claim 2, further providing:

that the periphery supporting means include elements selected from the group consisting of flexible polymeric materials, coil springs, magnets and rigid members.

4. A liquid draining apparatus as set forth in claim 3, further providing:

a drain tube positioned within the sheet central area whereby liquid flowing onto the sheet liquid side flows out through the drain tube.

5. A liquid draining apparatus as set forth in claim 3, further providing:

that the polymeric supporting means are formed of the sheet material.

6. A liquid draining apparatus as set forth in claim 5, further providing:

that the polymeric supporting means are integral with the sheet.

7. A liquid draining apparatus as set forth in claim 3, further providing:

that at least one magnet is bonded to an element of the sheet periphery.

8. A liquid draining apparatus as set forth in claim 3, further providing:

that the seal means comprises a liquid tight bearing mechanically fastened to the sheet.

9. A liquid draining apparatus as set forth in claim 3, further providing:

that the rigid members are oriented to engage a drain structure positioned under the sheet.

10. A liquid draining apparatus as set forth in claim 9 further providing:

that the under-positioned drain structure is a funnel.

11. A liquid draining apparatus as set forth in claim 3 further providing:

means for biasing at least one element of the sheet periphery to a level lower than the central area.

12. A liquid draining apparatus as set forth in claim 11 further providing:

that the biasing means comprises weight means attached to said periphery element.

13. A liquid draining apparatus as set forth in claim 3 further providing:

that the shaft seal means is within the central area.

14. A liquid draining apparatus as set forth in claim 3 further providing:

that the shaft seal means is without the central area.

15. A liquid draining apparatus as set forth in claim 3 further providing:

that the shaft liquid end includes means for retaining the drain plug.

16. A liquid draining apparatus as set forth in claim 15 further providing:

that the plug retaining means is a magnet embedded in the liquid end of the shaft and protruding therefrom.

\* \* \* \* \*